W. P. SPRINGER.
Smut Mill.
No. 87,441.  Patented March 2, 1869.
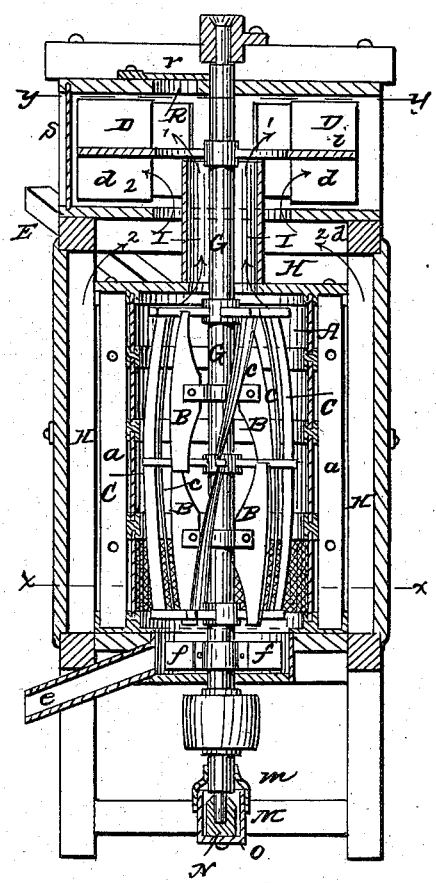
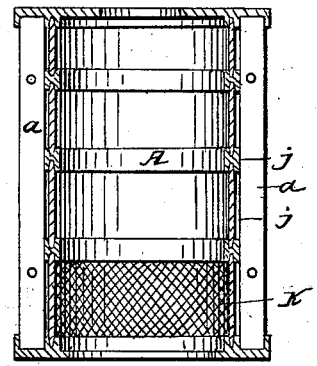
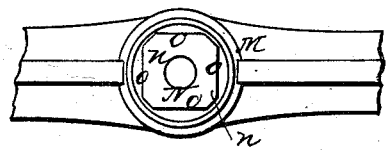
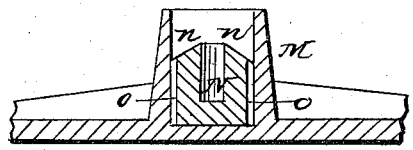
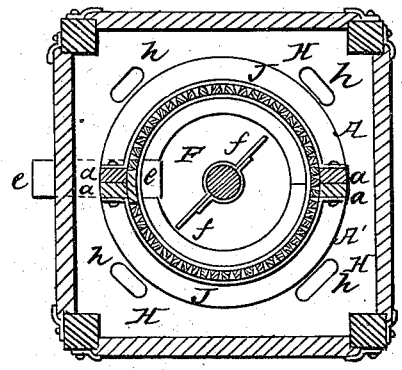
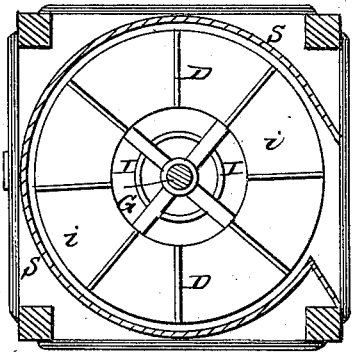

WILLIAM P. SPRINGER, OF OSWEGO, NEW YORK.

Letters Patent No. 87,441, dated March 2, 1869.

IMPROVED SMUT-MACHINE.

The Schedule referred to in these Letters Patent and making part of the same.

*To all whom it may concern:*

Be it known that I, WILLIAM P. SPRINGER, of Oswego, in the county of Oswego, and State of New York, have invented a new and useful Improvement in Smut-Machines; and I do hereby declare that the following is a full, clear, and exact description thereof, which will enable those skilled in the art to make and use the same, reference being had to the accompanying drawings, forming a part of this specification, in which—

Figure 1 is a vertical section.

Figure 2 is a horizontal section, taken in the line $x$ $x$ in fig. 1.

Figure 3 is a horizontal section, taken in the line $y$ $y$ in fig. 1.

Figures 4, 5, and 6, are detail views.

Similar letters of reference indicate like parts in all the figures.

In the accompanying drawings—

A A is the scouring-cylinder;
C c is the scouring-wheel;
D d is a double-suction blast-wheel; and
S S is the blast-wheel case, figs. 1 and 3.

The grain is admitted through spout E, fig. 1, to the scouring-cylinder A, and after working down through the scouring-cylinder, the grain falls into a chamber, F, below the beaters or scouring-wheel, figs. 1 and 2, and from this chamber it is pushed into spout $e$, by arms or wings $f f$, which are fixed on the shaft G, and revolved therewith, and the grain having been delivered by the spout $e$, has passed through the machine.

The scouring-wheel is fixed on the main shaft G, and is made up of a series of narrow outer beaters C c, and of several wider ones, B B, nearer its centre. All the beaters have a backward inclination, which tends to sustain the grain longer in the cylinder A, and also helps the upward draught of air within the cylinder.

The blast-wheel is also fixed on the shaft G, and is mode double by a horizontal web or diaphragm, $i$ $i$, figs. 1 and 3, which divides the wings of the wheel into two parts; D, fig. 1, being the upper part, and $d$, the lower part.

Outside of the cylinder A is an annular chamber, H H, figs. 1 and 2. The lower part, $d$ of the blast-wheel, draws air from this said chamber H, as indicated by arrows 2, and the upper part, D, draws air from the inside of the scouring-cylinder, by means of a tube, I, which connects the open centre of the blast-wheel with the upper end of the scouring-cylinder.

Air passes into the pipe $e$ as the grain is coming out, and passes through the grain which is being agitated in chamber F, by the wings $f$ $f$, and a portion of this air then flows up through the grain in the scouring-cylinder, and into pipe I, and thence to the upper blast-wheel, while the other portion of air flows outward, through the slotted sides of the cylinder A, into chamber H, and thence to the lower blast-wheel, as indicated by the arrows 2.

The chamber H does not receive all of its air through the slotted sides of the cylinder, but takes in a portion of it through holes $h$ $h$, fig. 2, in the floor of the chamber H.

To regulate the draught, or power of the blast, an opening, R, fig. 1, is made in the casing over the blast-wheel, and a valve, $r$, is provided, and when the blast is too powerful, the valve $r$ is opened more or less, as the case demands, and air admitted to the wheel, and by this means the force of the blast is regulated.

The scouring-cylinder is made in two parts, A A', fig. 2, and these parts are secured to each other by bolting their wooden flanges $a$ $a$ together.

Fig. 4 shows an inside view of one of the parts of the scouring-cylinder.

These parts, A, are made up by fastening grooved segments $j$ $j$ to the flanges or wooden bars $a$ $a$, and then filling the grooves with short vertical bars J, and in this manner the body of the scouring-cylinder is built up.

The bars J are made slightly broader at their ends than at their central parts, so that a narrow slot or opening is left between each of the two bars, to allow the fine dust, &c., to be drawn through the sides of the cylinder, and be separated from the grain as it is being scoured; and these vertical bars J are also made a little more narrow on their outside faces than they are on the inside, as shown by J, fig. 2, to give the slots plenty of clearance.

The segments $j$, fig. 4, are grooved on their scouring-faces, and project slightly into the chamber of the cylinder, so as to form narrow ribs or shelves, which delay the passage of the grain down the cylinder.

The vertical bars J are dispensed with in the last or lower section of the scouring-face, and a diamond-grooved face, K, substituted, which is very effective, as the grain drifts over this face in a zigzag manner, being continually thrown up and down, and constantly changing direction.

The step for the shaft G consists in a cup-shaped vessel, M, figs. 1, 5, and 6, in which is placed a removable box or step, N.

This box has an inclined upper face, $n$ $n$, as seen in vertical section, fig. 6, which conveys all dirt, which comes out on to the upper part of the box, into pockets or spaces $o$ $o$, (see top view, fig. 5,) which are formed by cutting away the sides of the box N.

After the shaft G is placed in the step, the cup M is filled with oil, so that the box N is fully covered by the oil, and a cape or cap, $m$, fig. 1, is then placed over the mouth of the cup M, to exclude dust therefrom. With this step so constructed, it will run a whole year, or longer, without any attention, and keep in perfect order.

The inclined surface $n$ carries all dirt away from the rubbing parts, and this dirt is secreted or deposited in the pockets $o$ $o$. These pockets may be made in the sides of the cup M, instead of making them in the sides of the box N.

When the box has become fouled by long use, it is removed, and the pockets cleaned out.

By these means I obtain a machine that is durable, is easily controlled, and does its work in a thorough manner.

Having thus described my invention,

I do not claim, broadly, a scouring-cylinder made of grooved rings $j$ and bars $J$, as I am aware that this is not new, but I do claim—

1. The arrangement of the double fan D $d$ $i$, scouring-cylinder A A', connecting-pipe I, and surrounding air-chamber H, all constructed and operating substantially as herein set forth.

2. The shaft G, provided with the beaters B C, fan D $d$ $i$, and scrapers $f$, and resting in the block N $n$ $o$, removably fitted in the box M, and covered with a cap, $m$, in combination with the scouring-cylinder A A' and chambers H F, all substantially as herein set forth.

The above specification of my invention signed by me, this 16th day of November, 1868.

WM. P. SPRINGER.

Witnesses:
R. HIRSH,
F. A. MORLEY.